Figure 3:
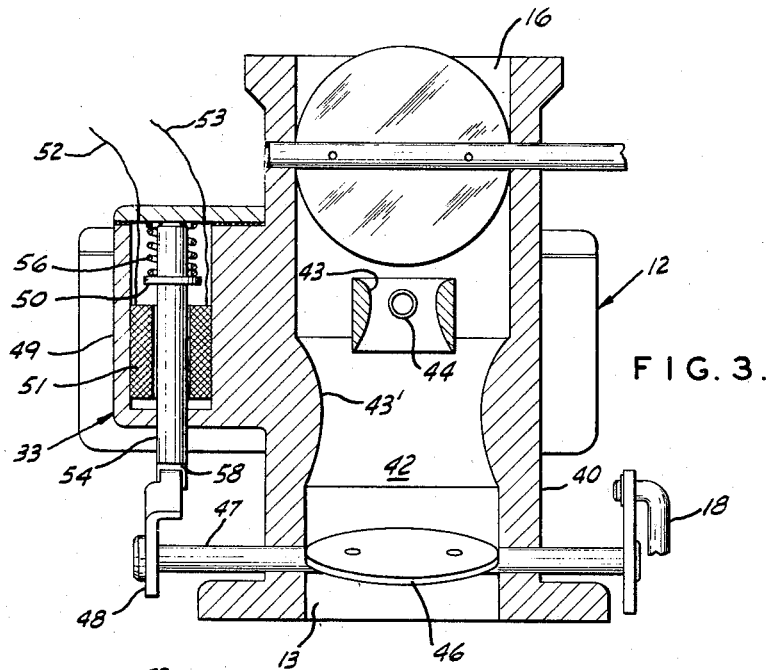

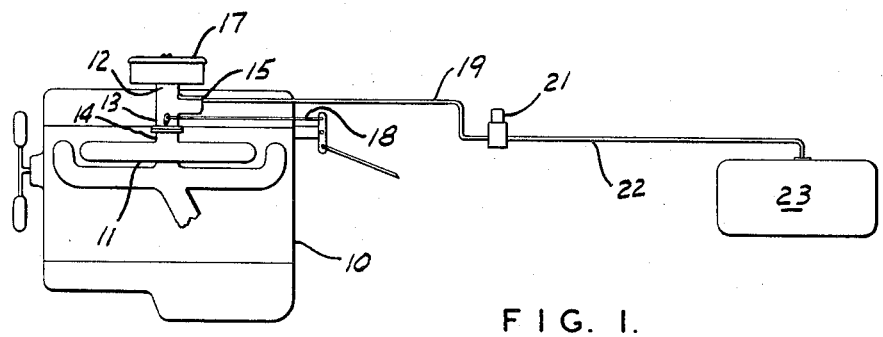
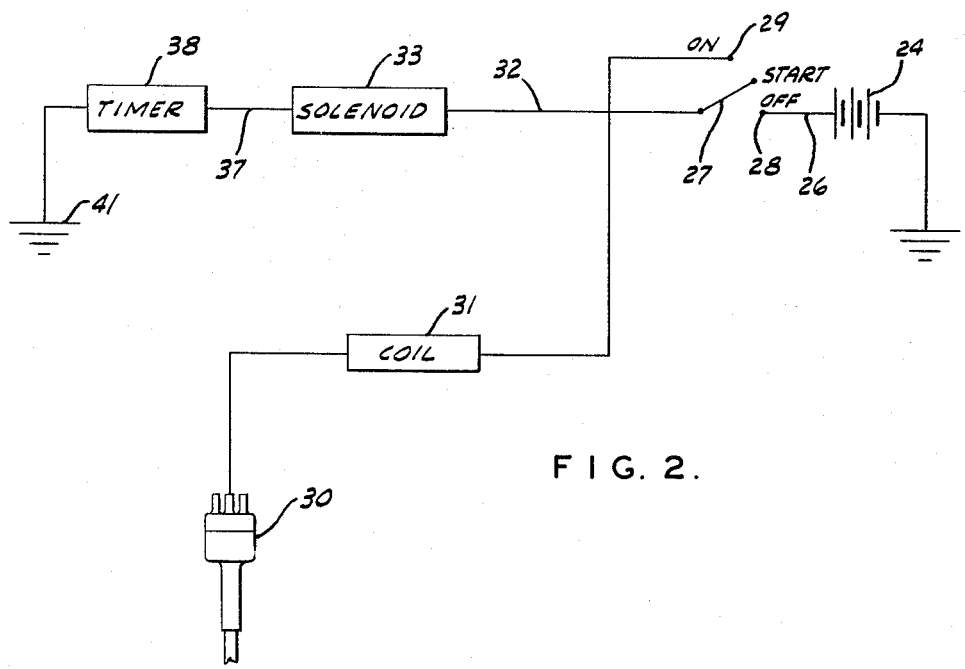

INVENTORS
ALBERT W. ZUB
EDWARD N. CRAWFORD
BY Robert B. Burns
ATTORNEY

United States Patent Office 3,354,877
Patented Nov. 28, 1967

3,354,877
MEANS FOR PREVENTING AUTO IGNITION AT ENGINE SHUT DOWN
Albert W. Zub, St. Louis, and Edward N. Crawford, Ferguson, Mo., assignors to ACF Industries, Incorporated, New York, N.Y., a corporation of New Jersey
Filed Mar. 25, 1966, Ser. No. 537,391
9 Claims. (Cl. 123—198)

The invention relates to a fuel system for an internal combustion engine and particularly to a system including means to positively discontinue engine operation during overheated conditions.

Dieseling is a term that defines a condition often arising in a carburetor controlled internal combustion engine as a result of generation of excessive heat in the engine.

Notably, when the engine is permitted to overheat a sufficient degree such that the compressed air fuel mixture in the cylinders exceeds the mixture ignition temperature, the latter will ignite without an initiating spark. The problem of dieseling is accentuated in the instance of modern automotive engines which are built to power not only the vehicle but also copious accessories such as air conditioners, power steering, etc. In order to maintain a sufficiently fast curb idle speed in such an engine, it is necessary to adjust the carburetor to provide a relatively great fuel mixture flow. Thus, the problem of dieseling is further accentuated by the basic carburetor characteristics which require that a substantial air fuel mixture be provided to the engine at curb idle.

It is clear that under the proper conditions where an automotive engine becomes overheated, a dieseling condition will be maintained even though the engine ignition might be disconnected.

The present invention therefore contemplates a fuel system and control therefor adapted to provide a more positive engine cutoff and avoid the contingency of engine dieseling. The present device is interconnected with the engine ignition system and functions for a limited period subsequent to the engine being shut off, whereby air fuel mixture through the carburetor is positively precluded. The arrangement includes an electrically actuated solenoid timed to be energized for a limited period after the ignition is shut off, and interconnected to the carburetor throttle to override the normal curb idle throttle setting thereby permitting complete choking of air fuel mixture to the engine.

It is therefore one object of the invention to provide a fuel system for an internal combustion engine adapted to overcome a dieseling condition. A further object is to provide a fuel system for such an engine to override the normal curb idle carburetor setting. A still further object is to provide automatic carburetor control for a period of time after the engine ignition system has been cutoff. Other objects of the invention will be clear to those skilled in the art from the following description of the invention made in conjunction with the accompanying drawings.

The invention in brief contemplates a fuel system for an internal combustion engine having a carburetor or charge forming device connected to the engine and to a fuel source for delivering an air fuel mixture to the engine intake manifold. The carburetor includes a body having a mixture conduit. A throttle disposed in the mixture conduit is journalled in the body and includes a throttle plate carried on a shaft extending externally of the body to be manipulated and thereby adjust the rate of air fuel mixture flow. Limiting means depending from the throttle is adjustable to properly position the latter and to achieve a desired curb idle speed.

The internal combustion engine includes an ignition or electric circuit connected to a 6 or 12 volt DC current source such as a storage battery or the like. Said circuit structure includes a multiposition starter switch for energizing and deenergizing the electric circuit. A solenoid including a coil having an actuating core is connected into the ignition circuit in such manner to be actuated when the starter switch is adjusted to the "off" position. A timer mechanism also connected into the electric circuit and with the solenoid, limits operation of the latter to a predetermined period of time after the starter switch is disconnected.

Referring to the drawings, FIGURE 1 illustrates a schematic arrangement of a typical internal combustion engine utilizing a downdraft carburetor for metering an air fuel mixture to the engine. The internal combustion engine 10 includes intake manifold 11 having a plurality of outlets each being communicated with respective engine cylinders. A carburetor 12, of the downdraft type, includes a discharge opening 13 connected to the inlet 14 of intake manifold 11 to deliver an air fuel mixture to the latter. Carburetor 12 includes an inlet 16 which is provided with an air filter 17, and with a throttle actuating linkage connected to the throttle. Carburetor 12 further includes a fuel inlet 15 connected by way of line 19 to fuel pump 21 which is communicated in turn through line 22 to a fuel source carried in fuel tank 23.

Under normal engine operation, fuel is pumped from tank 23 through pump 21 to line 19 and thence to a float chamber in carburetor 12. Thereafter, the fuel is metered through a suitable jet arrangement to the carburetor mixture conduit which passes an air stream to aspirate a desired amount of fuel for mixture with the latter. The combustible air fuel mixture is then delivered to intake manifold 11 and distributed to the respective cylinders. Following standard practice, the engine is actuated by an ignition system shown in FIGURE 2 which includes basically a source of direct current such as a storage battery 24 grounded on one side and connected through line 26 to one terminal of engine starter switch 27 having a plurality of terminals 28 and 29. Switch 27 normally serves to connect the ignition system to current source 24 either for starting and operating the engine, or alternately for actuating accessories when the engine is out of operation. Switch 27 is normally connected through line 35 and ignition coil 31, to a spark distributor 30, and thence to the respective spark plugs in the engine cylinders. Switch 27 is also connected through line 32 to a solenoid 33 comprising a coil for controlling an actuator. A line 37 connects a timer 38 which may comprise a DC motor connected through a suitable connection to ground 41.

It is understood that the above described electrical ignition circuit includes primarily the main components relative to the present invention. It is further understood however, that the ignition circuit adapted for supplying the entire electrical requirements to an automotive vehicle may include various other circuits which are not presently shown.

FIGURE 3 illustrates a single barrel carburetor 12 including the throttle control mechanism of the present invention. The carburetor includes essentially a body 40 having air inlet 16 at the upper end of a mixture conduit 42 which may include one or more venturis 43 and 43' which serve to constrict the incoming air flow. Fuel nozzle 44 is communicated with the carburetor float chamber not presently shown which however, holds a supply of fuel and includes a suitable metering valve for controlling the flow of said fuel nozzle 44. A throttle plate 46 disposed downstream of venturi 43 and at discharge opening 13, is carried on a throttle shaft 47 journalled in body 40, having the ends thereof projecting externally to the carburetor body. Control linkage depending from shaft 47 includes a lever or plate 48 which is connected in turn to actuating linkage 18.

Figure 5:
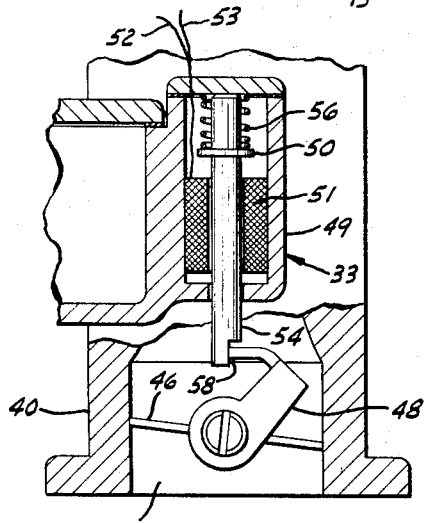
Figure 4:
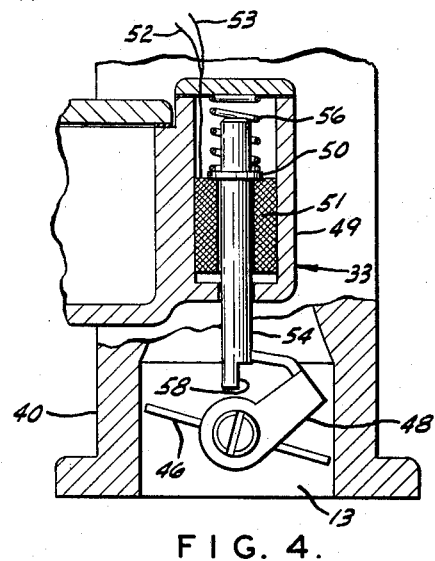

Referring to FIGURES 3, 4, and 5, carburetor body 40 is provided with a well or similar means for retaining a solenoid unit 33 consisting primarily of a solenoid casing 49 which holds an energizing coil 51 connected through electrical leads 52 and 53 into the ignition circuit shown in FIGURE 2. A core piece or limiting means 54 is guidably mounted in casing 49 concentrically with the center opening in coil 51. Core piece 54 is normally urged to a down position by a compression spring 56 bearing against a shoulder 50 formed at the core piece 54 upper end.

The lower end of core piece 54 is provided with a stepped portion or indentation 58 for engaging a corresponding surface of lever plate 48. Plate 48 as shown in FIGURES 4 and 5 is fixedly mounted on shaft 47 and includes a protruding tab 59 at the periphery thereof, disposed to engage both the stepped portion 58 and the outer surface of core piece 54.

Following usual carburetor practice, lever 48 is normally spring biased into the position shown in FIGURE 4 whereby the throttle plate 46 is disposed in curb idle position such as to provide a minimal opening between the periphery of plate 46 and the adjacent wall of the lower end of mixture conduit 42. Tab 59 is preferably an adjustable member to permit more accurate positioning of plate 48 with respect to core piece 54 thereby to achieve an optimum throttle setting and a desired curb idle speed. Thus, plate 48 is normally rotated as shown in FIGURE 4 in a clockwise direction for adjusting the position of the throttle to a more open position and consequently a greater engine speed. At engine curb idle, however, with plate 48 returned to its rest position, tab 59 is in abutting engagement with the periphery of core piece 54.

Referring to FIGURE 5 with core piece 54 in the upward or withdrawn position, stepped portion 58 will be disposed adjacent to and in alignment with tab 59. This permits the latter to engage said tab 59 and thus advance plate 48 in a clockwise direction until the periphery of throttle plate 46 engages the adjacent walls of mixture conduit 42 to form a substantial and complete closure thereacross and prevent a flow of air fuel mixture therethrough.

Referring to FIGURE 2, under normal operating conditions, and prior to the engine being started, engine starter switch 27 is open thus isolating the ignition and the electrical circuit from current source 24. At this time and referring to FIGURE 4, the solenoid 33 is deenergized thus permitting core piece 54 to be urged by spring 56 to a downward position. Tab 59 thus engages the periphery of the core piece 54 and positions the throttle plate 46 to curb idle position. To start the engine, the starter switch 27 is adjusted to "on" position to actuate the starter motor not presently shown, the switch 27 is then permitted to come to rest in a closed position with contact 29 to complete the spark circuit. The ignition system will maintain this position so long as the engine is in operation.

Normally, for shutting off the engine, it is necessary only to adjust switch 27 to "off" position thus disconnecting the electrical circuit from power source 24. However, and as previously noted in the instance of an overheated engine, merely disconnecting the ignition from the spark coil will not discontinue operation of the engine because of the dieseling effect. According to the invention however, when switch 27 is moved to the "off" position, the power source 24 is connected into the circuit comprising solenoid 33 and time 38. The circuit is thus energized thereby withdrawing core piece 54 to the position shown in FIGURE 5. When so positioned, lever 48 will be spring-biased counterclockwise thereby bringing throttle plate 46 into closed engagement with the walls of mixture conduit 42. The mixture conduit is now substantially sealed to obviate flow of either air or fuel to engine intake manifold 11.

This choking off of air fuel mixture functions to positively discontinue engine operation since no fuel mixture is metered to the latter. It is therefore necessary to maintain throttle plate 46 in the closed position merely for a matter of seconds in order to bring the engine to a complete stop.

Thus, after a short period of time, the timer mechanism 38 will run its preset period and disconnect the timer-solenoid circuit from the power source to deenergize solenoid coil 33 and release core piece 54, the latter will now descend until step 61 engages the surface of tab 59 thereby positioning core piece 54 in a partially released disposition. Core piece 54 will remain thus until the engine is again restarted to achieve the latter, and following normal starting procedure, linkage 18 will be actuated sufficiently to pump the carburetor or to bring the automatic choke mechanism into place. In either instance, plate 48 will be rotated clockwise thereby disengaging tab 59 from step 61 and permitting core piece 54 to descend to its lowest position as shown in FIGURE 4. As the throttle is released to permit the engine to idle, plate 48 will rotate counter-clockwise to the position shown in FIGURE 4. Thus, throttle plate 46 will assume its preferred setting to maintain engine curb idle speed.

It is understood that the herein described invention may embody several variable factors each toward contributing to the primary function of the described structure and circuit. For example, an alternate positioning of the solenoid element 33 might preferably be in a plane normal to the mixing conduit central axis. Thus, core piece 54 will be actuated in a direction more compatible to the arcuate path of tab 59. With such an arrangement, the core piece will of course be adjusted between two positions for establishing the setting of plate 48 in much the same manner as heretofore described. However, it is appreciated that the positive discontinuance of air fuel feed to the carburetor will achieve a positive shutoff of the engine even though a few seconds' delay might be necessitated.

It is further appreciated by those skilled in the automotive art that certain mechanical and electrical features of the system might be modified without departing from the spirit and scope of the invention as hereinafter claimed.

We claim:

1. In a fuel system for an internal combustion engine including a carburetor having; a body, a mixture conduit formed in said body, a throttle comprising a plate carried on a shaft, the latter being journalled in the body and operable between open and closed positions to regulate air flow through said mixture conduit to control engine speed, limiting means for locating said throttle in a partially open position to pass sufficient air and fuel mixture therethrough whereby said internal combustion engine is sustained at idle speed, an ignition circuit including a source of electric current, and an engine starter switch, the latter being adjustable to "on" and "off" positions to control operation of said internal combustion engine, electrically actuated release means connected to said carburetor for permitting said throttle to assure a fully closed position in the mixture conduit thereby substantially closing the latter to preclude flow of air-fuel mixture therethrough, and timer means connected to said electrically actuated release means and to said ignition circuit respectively to maintain said release means in the actuated position for a predetermined period of time subsequent to said engine starter switch being adjusted to the "off" position to discontinue operation of the engine.

2. In a system as defined in claim 1 wherein said electrically actuated release means includes; a coil connected in said ignition circuit and actuated when said engine starter switch is adjusted to "off" position, and a plunger movably responsive to said coil and being operably connected to said limiting means.

3. In a system as defined in claim 1, wherein said timer means includes a timer motor that is activated for a limited period when said engine starter switch is adjusted to the "off" position.

4. In a system as defined in claim 1 wherein said limiting means includes a lever connected to said throttle shaft and disposed externally of the carburetor body.

5. In a system as defined in claim 4 wherein said electrically actuated release means includes a plunger operably connected to said lever to position the latter when the engine is operating at idle speed.

6. In a system as defined in claim 4 including adjusting means for regulating the position of said lever to provide a suitable idle speed to the internal combustion engine.

7. In a system as defined in claim 5 wherein said plunger is disposed substantially parallel to said mixture conduit and includes a contact end having a first portion for engaging said lever when said plunger is in the actuated position and a second portion for engaging said lever when the plunger is in the nonactuated position.

8. In a system as defined in claim 5 wherein said plunger is disposed substantially tangential to the periphery of said lever and having a contact end for engaging said lever when said plunger is in the actuated and nonactuated positions.

9. In a system as defined in claim 3 wherein said timer includes means for automatically disconnecting the timer from said source of current after a predetermined interval.

References Cited

UNITED STATES PATENTS

| | | | |
|---|---|---|---|
| 2,125,066 | 7/1938 | Cox et al. | 123—198 |
| 2,929,226 | 3/1960 | Baker et al. | 123—198 X |
| 2,943,615 | 7/1960 | Kainz | 123—198 X |
| 3,056,393 | 10/1962 | Friddell | 123—198 X |
| 3,251,352 | 5/1966 | Walker | 123—198 X |

WENDELL E. BURNS, *Primary Examiner.*